(12) United States Patent
Roy et al.

(10) Patent No.: US 11,614,557 B2
(45) Date of Patent: Mar. 28, 2023

(54) DATA-DRIVEN DOMAIN CONVERSION USING MACHINE LEARNING TECHNIQUES

(71) Applicant: Landmark Graphics Corporation, Houston, TX (US)

(72) Inventors: Samiran Roy, Bengaluru (IN); Soumi Chaki, Karnataka (IN); Sridharan Vallabhaneni, Karnataka (IN)

(73) Assignee: Landmark Graphics Corporation, Houston, TX (US)

( * ) Notice: Subject to any disclaimer, the term of this patent is extended or adjusted under 35 U.S.C. 154(b) by 379 days.

(21) Appl. No.: 16/841,890

(22) Filed: Apr. 7, 2020

(65) Prior Publication Data
US 2021/0311221 A1   Oct. 7, 2021

(51) Int. Cl.
*G01V 1/48* (2006.01)
*G01V 1/36* (2006.01)
(Continued)

(52) U.S. Cl.
CPC ............... *G01V 1/48* (2013.01); *G01V 1/362* (2013.01); *G06F 18/2163* (2023.01); *G06N 3/08* (2013.01); *G06N 20/00* (2019.01); *G06V 10/70* (2022.01); *G06V 10/82* (2022.01); *G01V 2210/514* (2013.01)

(58) Field of Classification Search
None
See application file for complete search history.

(56) References Cited

U.S. PATENT DOCUMENTS

2015/0316673 A1* 11/2015 Wiener ................. G01V 1/32
702/14
2017/0250294 A1   8/2017 Zenou et al.
(Continued)

FOREIGN PATENT DOCUMENTS

WO   2019/236339 A1   12/2019

OTHER PUBLICATIONS

Li, S., Liu, B., Ren, Y., Chen, Y., Yang, S., Wang, Y., & Jiang, P. (2019). Deep-learning inversion of seismic data. arXiv preprint arXiv:1901.07733. (Year: 2019).*
(Continued)

*Primary Examiner* — David Perlman
(74) *Attorney, Agent, or Firm* — Kilpatrick Townsend & Stockton LLP

(57) ABSTRACT

Optimizing seismic to depth conversion to enhance subsurface operations including measuring seismic data in a subsurface formation, dividing the subsurface formation into a training area and a study area, dividing the seismic data into training seismic data and study seismic data, wherein the training seismic data corresponds to the training area, and wherein the study seismic data corresponds to the study area, calculating target depth data corresponding to the training area, training a machine learning model using training inputs and training targets, wherein the training inputs comprise the training seismic data, and wherein the training targets comprise the target depth data, computing, by the machine learning model, output depth data corresponding to the study area based at least in part on the study seismic data; and modifying one or more subsurface operations corresponding to the study area based at least in part on the output depth data.

20 Claims, 6 Drawing Sheets

(51) Int. Cl.
*G06N 3/08* (2023.01)
*G06N 20/00* (2019.01)
*G06V 10/70* (2022.01)
*G06V 10/82* (2022.01)
*G06F 18/21* (2023.01)

(56) References Cited

U.S. PATENT DOCUMENTS

| | | | |
|---|---|---|---|
| 2019/0107644 A1* | 4/2019 | Farhadi Nia | G06N 3/088 |
| 2019/0250294 A1 | 8/2019 | Salman | |
| 2019/0293818 A1 | 9/2019 | Meek | |
| 2020/0088897 A1 | 3/2020 | Roy et al. | |
| 2020/0117580 A1* | 4/2020 | Lekivetz | G06N 3/0445 |
| 2020/0184374 A1* | 6/2020 | Liu | G06N 20/00 |
| 2021/0302606 A1* | 9/2021 | Al-Saleh | G01V 1/282 |

OTHER PUBLICATIONS

CA. Application No. CA3107816, Office Action, dated Feb. 10, 2022, 5 pages.
International Search Report and Written Opinion issued in related PCT Application No. PCT/US2020/027378 dated Jan. 8, 2021, 9 pages.
Wang, Wenlong & Yang, Fangshu & Ma, Jianwei. (2018). Velocity model building with a modified fully convolutional network. 2086-2090. 10.1190/segam2018-2997566.1., 5 pages.
Campos, Luan & Nogueira, Peterson & Nascimento, Erick. (2019). Tuning a Fully Convolutional Network for Velocity Model Estimation. 10.4043/29904-MS., 11 pages.
Campos, Luan & Nogueira, Peterson & Nascimento, Erick. (2019). Estimating Initial Velocity Models for the FWI Using Deep Learning. 1-4. 10.22564/16cisbgf 2019.212, 5 pages.
Wang, Wenlong & Ma, Jianwei. (2019). VMB-Net: A deep learning network for velocity model building in a cross-well acquisition geometry. 2569-2573. 10.1190/segam2019-3216078.1., 5 pages.
Park, Min & Sacchi, Mauricio. (2019). Automatic velocity analysis using convolutional neural network and transfer learning. Geophysics. 85. 1-45. 10.1190/geo2018-0870.1, 11 pages.
Li, Shucai & Liu, Bin & Ren, Yuxiao & Chen, Yangkang & Yang, Senlin & Wang, Yunhai & Jiang, Peng. (2019). Deep-Learning Inversion of Seismic Data. IEEE Transactions on Geoscience and Remote Sensing. 10.1109/TGRS.2019.2953473, 12 pages.
Campos, Nogueira, Moreira, Nascimento (2019) An Empirical Analysis of the Influence of Seismic Data Modeling for Estimating Velocity Models With Fully Convolutional Networks. ISSN:11690-4524 Systemics, Cybernetics and Informatics vol. 17, No. 4., 7 pages.
Krebs, J. & Bear, L. & Liu, J . . . (2004). Integrated Velocity Model Estimation for Accurate Imaging. 10.3997/2214-4609.201405664., 4 pages.
Meng, Zhaobo, Paul A. Valasek, Steve A. Whitney, Carl B. Sigler, Brian K. Macy, N. Dan Whitmore. (2004). 3D global tomographic velocity model building. Seg Technical Program Expanded Abstracts. 23. 10.1190/1.1851234., 4 pages.
Bader, Sean & Fomel, Sergey & Xue, Zhiguang. (2018). Using well-seismic mistie to update the velocity model. 5218-5222. 10.1190/segam2018-2998324.1., 5 pages.
Zhang, Wenyuan & Stewart, Robert. (2019). Using FWI and deep learning to characterize velocity anomalies in crosswell seismic data. 2313-2317. 10.1190/segam2019-3216361.1., 5 pages.

* cited by examiner

DATA-DRIVEN DOMAIN CONVERSION USING MACHINE LEARNING TECHNIQUES

FIELD OF THE INVENTION

The present disclosure relates to a system and methods for optimizing domain conversion to enhance subsurface operations, and more specifically to using machine learning techniques to optimize domain conversion of subsurface time-domain seismic data to subsurface depth-domain data to enhance the accuracy of subsurface operations.

BACKGROUND

Depth estimations are a major challenge in the oil and gas industry with existing solutions requiring multiple time-intensive steps that often require user expertise to ensure accurate results. One frequently used method for estimating depths of subsurface features in subsurface exploration includes domain conversion of seismic data using a well-calibrated velocity model. Seismic data may be measured using one or more subsurface or surface seismic sensors, including without limitation vertical seismic profiling (VSP). The measured seismic data resides in the time-domain. That is, the seismic data may represent an elapsed period of time. For example, seismic data may comprise a measurement of the time it takes a signal to travel directly from a seismic source through one or more substances, which may include a subsurface geology, to a seismic sensor. In some cases, seismic data may include reflected signals comprising measurements of the time it takes a signal to travel from a seismic source through one or more substances, which may include a subsurface geology, to a subsurface feature, reflect off the subsurface feature, and return to a seismic sensor. The time-domain seismic data is not directly indicative of the depth of subsurface features. Accordingly, complex time-to-depth conversions are used to convert the seismic data from the time domain to the depth domain. Depth-domain data may correspond to the depth of subsurface features in a subsurface formation. In some cases, the depth-domain data may be used to calculate the depth or volume of a subsurface reservoir in a subsurface formation. The subsurface reservoir may contain hydrocarbons and subsurface operations, including for example, drilling one or more wells, may enable access to and production of the hydrocarbons in the reservoir.

Conventional methods of converting time-domain seismic data uses a velocity model. Velocity modeling involves modeling how seismic signals travel through subsurface geology. However, velocity modeling typically requires multiple steps, which can be time consuming. For example, there may be time mismatches in the form of well-to-seismic ties that require multiple iterations to provide accurate results. Additionally, experts may be required to evaluate one or more of seismic data, well log data, and one or more velocity models to ensure accurate conversion results. For example, an experienced modeling expert may be required to predict how the velocity of the subsurface signals varies with a variety of features including subsurface rock types and subsurface features, including but not limited to subsurface porosity and the presence, size, and consistency of microfractures. Accordingly, a highly faulted subsurface geometry may complicate velocity modeling and render attempts to map subsurface geologies using velocity modeling prohibitively inefficient.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1A:
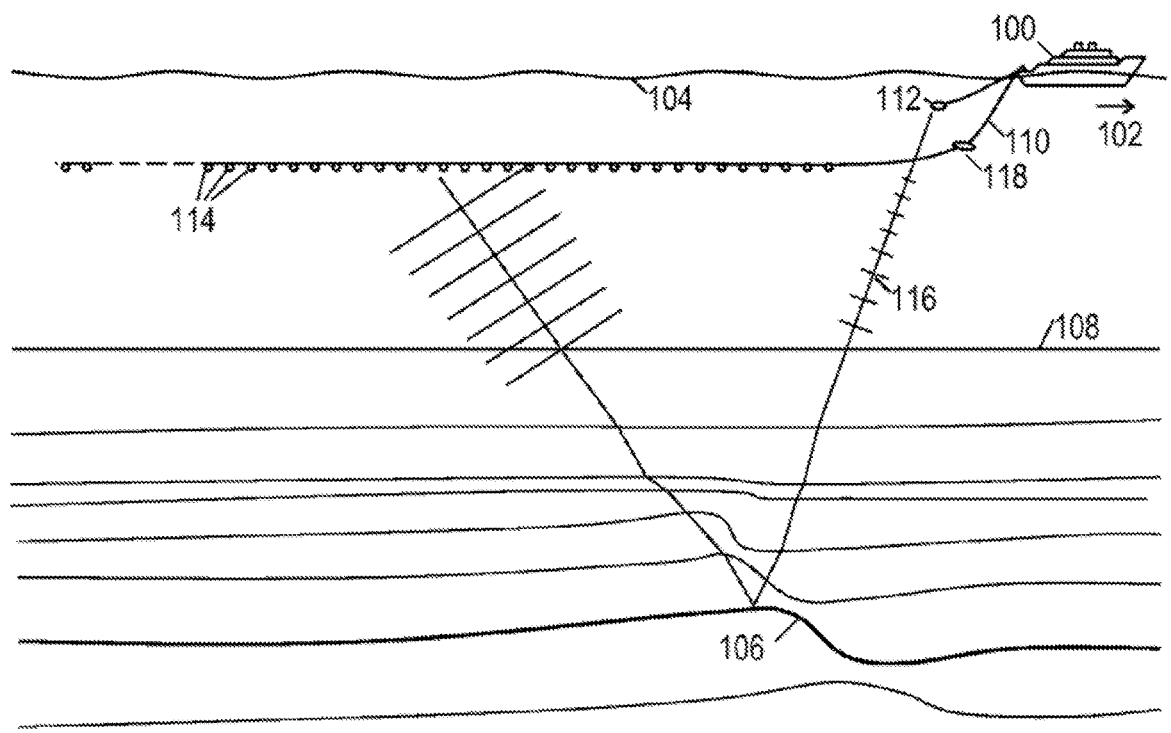
FIGS. 1A and 1B illustrate an exemplary marine seismic exploration system.

While embodiments of this disclosure have been depicted and described and are defined by reference to exemplary embodiments of the disclosure, such references do not imply a limitation on the disclosure and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DETAILED DESCRIPTION

The present disclosure relates to a system and methods for optimizing domain conversion to enhance subsurface operations, and more specifically to using machine learning techniques to optimize domain conversion of subsurface time-domain seismic data to subsurface depth-domain data to enhance subsurface operations.

Machine learning techniques may optimize domain conversion from subsurface time-domain seismic data to subsurface depth-domain data and may be used to enhance subsurface operations. In particular, machine learning models may reduce the need for expert analyses of subsurface seismic logs and improve the accuracy of depth estimations and corresponding reservoir volume estimations. Additionally, a machine learning model may be trained, validated, and tested using a subset of subsurface formation seismic data, which permits the remainder of the subsurface formation seismic data to be converted to depth-domain data using the machine learning model. Machine learning models may also be trained to convert time-domain seismic data to time-depth curves when depth-domain data is unavailable for training purposes. Machine learning models also enable calculation of depth information for geologically complex subsurface formations without the need for detailed geological interpretation by experts and therefore avoid potential biases introduced by experts into velocity models. Further, machine learning models are not only capable of quickly converting time-domain data to the depth domain, but may also be trained and updated more quickly. Additionally, machine learning models may enable higher resolution conversions.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit or define the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

In one or more embodiments of the present disclosure, a method for optimizing seismic to depth conversion to enhance subsurface operations comprises measuring seismic data in a subsurface formation, dividing the subsurface formation into a training area and a study area, dividing the seismic data into training seismic data and study seismic data, wherein the training seismic data corresponds to the training area, and wherein the study seismic data corresponds to the study area, calculating target depth data corresponding to the training area, training a machine learning model using training inputs and training targets, wherein the training inputs comprise the training seismic data, and wherein the training targets comprise the target depth data, computing, by the machine learning model, output depth data corresponding to the study area based at least in part on the study seismic data, modifying one or more subsurface operations corresponding to the study area based at least in part on the output depth data.

In one or more embodiments, the machine learning model comprises a deep neural network. In one or more embodiments, the method further comprises dividing the training area into a validating area and a testing area, dividing the training seismic data into validating seismic data and testing seismic data, wherein the validating seismic data corresponds to the validating area, and wherein the testing seismic data corresponds to the test area, dividing the target depth data into validating depth data and testing depth data, wherein the validating depth data corresponds to the validating area, and wherein the testing depth data corresponds to the testing area, and validating the machine learning model using validating inputs and validating targets, wherein the validating inputs comprise the validating seismic data, and wherein the validating targets comprise the validating depth data, and testing the machine learning model using testing inputs and testing targets, wherein the testing inputs comprise the testing seismic data, and wherein the testing targets comprise the testing depth data. In one or more embodiments, the validating seismic data and the testing seismic data are mutually exclusive, and wherein the validating depth data and the testing depth data are mutually exclusive. In one or more embodiments, the training inputs further comprise one or more post-stack attributes. In one or more embodiments, the training inputs further comprise one or more mask functions. In one or more embodiments, the one or more mask functions comprises use of fault polygons. In one or more embodiments, the training seismic data comprises 20 percent or less of the seismic data and the study seismic data comprises the remainder of the seismic data. In one or more embodiments, the target depth data comprises one or more time-depth target curves, and the output depth data comprises one or more time-depth output curves.

In one or more embodiments of the present disclosure, a non-transitory computer readable medium for storing one or more instructions that, when executed, causes a processor to train a machine learning model using training inputs and training targets, wherein the training inputs comprise training seismic data corresponding to a training portion of a subsurface formation, wherein the training seismic data corresponds to a training portion of the subsurface formation, wherein the training targets comprise target depth data, and wherein the target depth data corresponds to the training portion of the subsurface formation, compute, by the machine learning model, output depth data based at least in part on study seismic data, wherein the output data corresponds to a study area of the subsurface formation, and wherein the study seismic data corresponds to the study area of the subsurface formation, and suggest one or more subsurface operations corresponding to the study area of the subsurface formation based at least in part on the output depth data.

In one or more embodiments, the machine learning model comprises a deep neural network. In one or more embodiments, the one or more instructions that, when executed, further causes a processor to divide the training seismic data into validating seismic data and testing seismic data, wherein the validating seismic data corresponds to a validating area of the subsurface formation, wherein the testing seismic data corresponds to a test area of the subsurface formation, and wherein the validating seismic data and the testing seismic data are mutually exclusive, divide the target depth data into validating target depth data and testing target depth data, wherein the validating target depth data corresponds to the validating area, wherein the testing target depth data corresponds to the testing area, and wherein the validating target depth data and the testing target depth data are mutually exclusive, validate the machine learning model using validating inputs and validating targets, wherein the validating inputs comprise the validating seismic data, and wherein the validating targets comprise the validating target depth data, and test the machine learning model using testing inputs and testing targets, wherein the testing inputs comprise the testing seismic data, and wherein the testing targets comprise the testing target depth data. In one or more embodiments, the training inputs further comprise one or more post-stack attributes. In one or more embodiments, the training inputs further comprise one or more mask functions, and wherein the one or more mask functions comprises use of fault polygons. In one or more embodiments, the training seismic data comprises 20 percent or less of the seismic data and the study seismic data comprises the remainder of the seismic data.

In one or more embodiments of the present disclosure, a system for optimizing seismic to depth conversion to enhance subsurface operations comprises one or more seismic sensors for measuring seismic data from a subsurface formation, a machine learning model, wherein the machine learning model is coupled to the one or more seismic sensors, wherein the machine learning model is trained using training inputs and training targets, wherein the training inputs comprise training seismic data, wherein the training seismic data corresponds to a training area of the subsurface formation, wherein the targets comprise target depth data, wherein the target depth data corresponds to the training area of the subsurface formation, wherein the machine learning model computes output depth data based at least in part on study seismic data, wherein the study seismic data corresponds to a study area of the subsurface formation, and one or more subsurface operations equipment, wherein the one or more subsurface operations equipment receives the output depth data, and wherein the one or more subsurface operations equipment modify one or more subsurface operations based at least in part on the output depth data.

In one or more embodiments, the machine learning model comprises a deep neural network. In one or more embodiments, the training inputs further comprise one or more mask functions, and wherein the one or more mask functions comprises use of fault polygons. In one or more embodiments, the target depth data comprises one or more of one or more depths, one or more volumes, and one or more time-depth target curves, and wherein the output depth data comprises one or more of one or more depths, one or more volumes, and one or more time-depth output curves. In one or more embodiments, the one or more subsurface operations equipment modify the one or more subsurface operations by one or more of identifying one or more locations, drilling one or more bores, preparing one or more bores for production of one or more fluids, and producing the one or more fluids.

Figure 1B:
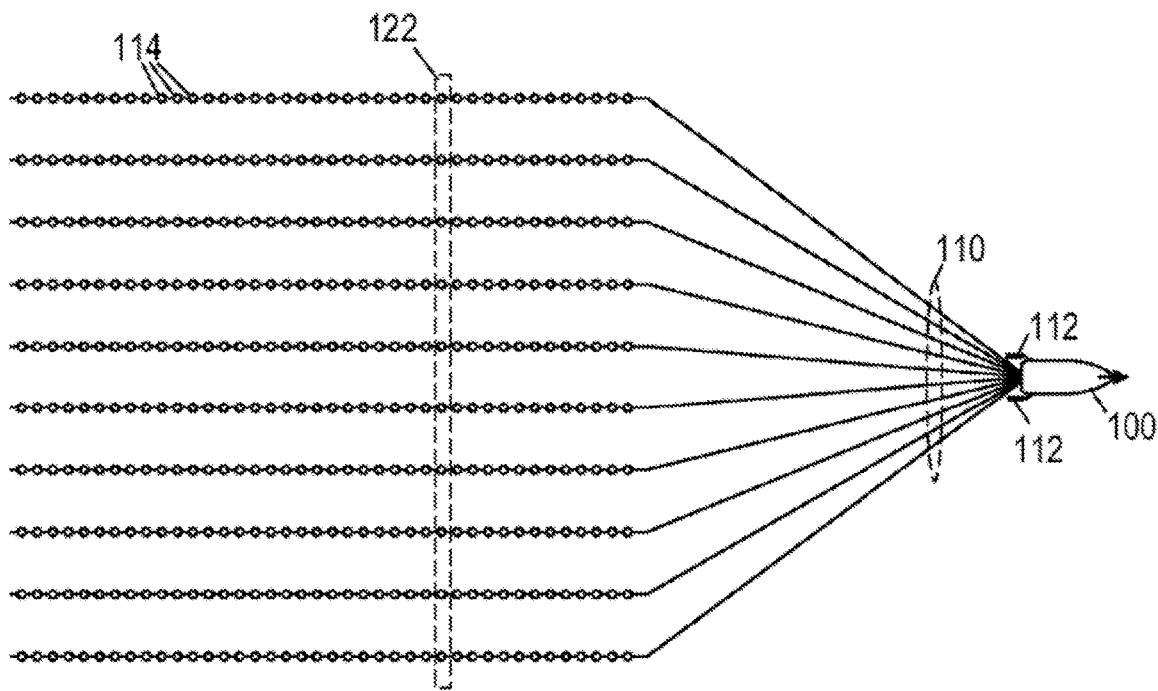

FIGS. 1A and 1B illustrate an exemplary marine seismic survey system. At sea, seismic survey ships deploy streamers behind the ship as shown in FIG. 1. Each streamer 110 trails behind the ship 100 as the ship moves forward (in the direction of arrow 102), and each streamer includes multiple evenly-spaced sensors 114. Each streamer 110 may further include a programmable diverter 118 and programmable depth controllers that pull the streamer out to an operating offset distance from the ship's path (see FIG. 1B) and down to a desired operating depth (FIG. 1A).

Streamers 110 may be up to several kilometers long, and may be constructed in sections from 25 to 100 meters in length. Each streamer may comprise groups of up to 35 or more uniformly spaced sensors. Each streamer 110 may comprise electrical or fiber-optic cabling for interconnecting sensors 114 and the seismic equipment on ship 100. Data from sensors 114 is digitized and transmitted to the ship 100 through the cabling at rates up to millions of bits of data per second.

As shown in FIG. 1, seismic survey ship 100 can also tow one or more sources 112. Source 112 may be an impulse source or a vibratory source. The sensors 114 used in marine seismology may be identified as hydrophones. In one or more embodiments, sensors 114 may be constructed using one or piezoelectric transducers. In one or more embodiments, suitable types of hydrophones may comprise one or more disk hydrophones and cylindrical hydrophones. Sources 112 and sensors 114 may be deployed below the ocean's surface 104.

Seismic surveys provide data for imaging below the ocean surface 104 to reveal one or more subsurface structures such as structure 106 of a formation, which lies below the seafloor 108. Analysts may employ seismic imaging methods to process the data, for example using velocity modeling, to map the topography of subsurface layers. Seismic survey data may also reveal various other characteristics of the subsurface layers which can be used to determine the locations of one or more fluids, including without limitation oil, gas, and water.

To image the subsurface structure 106, source 112 may emit seismic waves 116 that may be reflected where there are changes in acoustic impedance due to subsurface features 106 (and other subsurface reflectors). The reflected waves may be detected by a pattern of sensors 114. The arriving seismic waves 116 that have traveled from source 112 to subsurface structure 106 to sensors 114 may be recorded as a function of time and subjected to processing, including without limitation velocity modeling, to attempt to map the depth of the subsurface features.

FIG. 1 also shows an overhead view (not to scale) of the seismic survey ship 100 towing a set of streamers 110 and two sources 112. FIG. 1B. As the ship 100 moves forward, the sources may be triggered alternately in a so-called flip-flop pattern. Programmable diverters may be used to provide roughly even spacing between the streamers. The sensors at a given position on the streamers may be associated with a common field file trace number or common channel 122.

Figure 2:
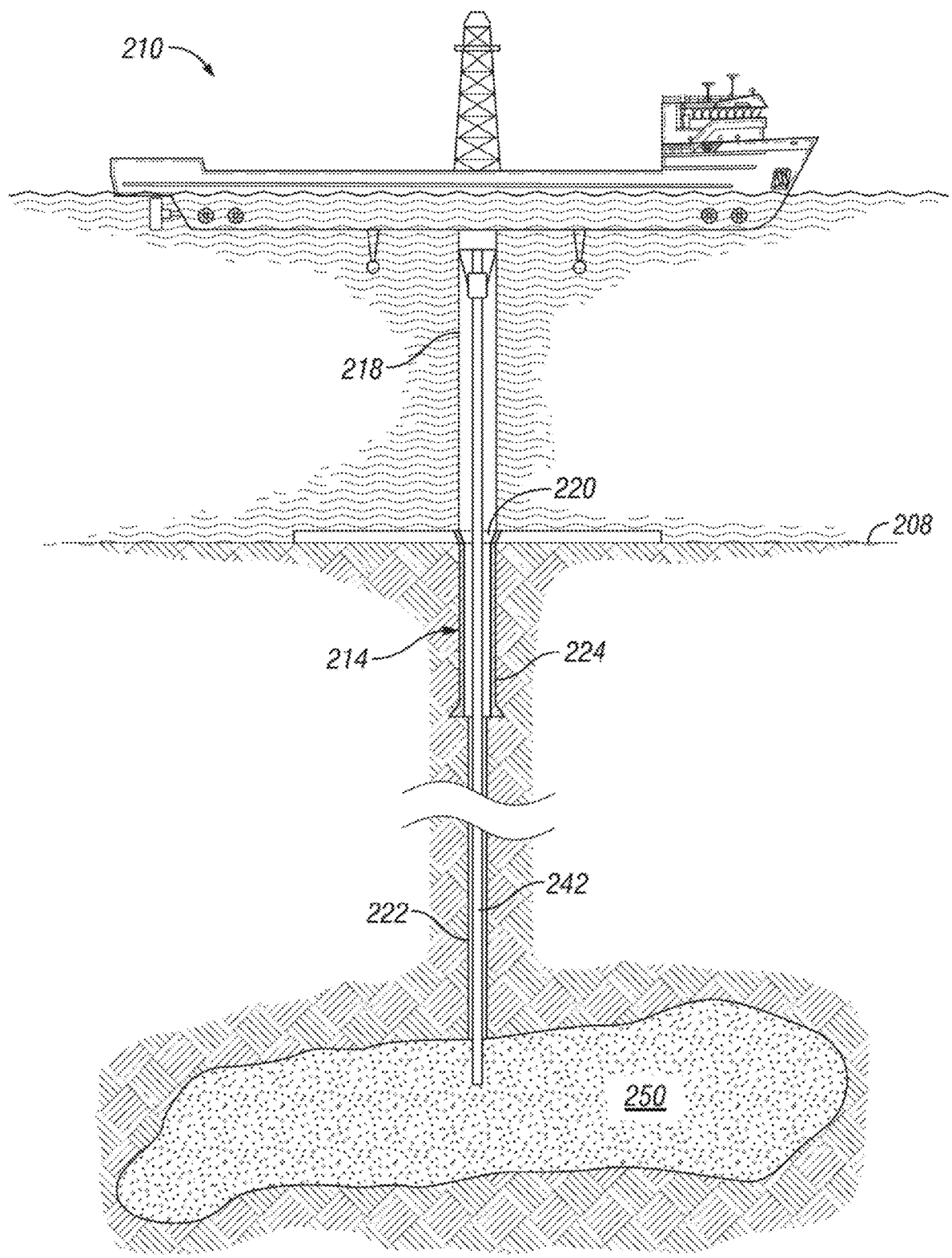
FIG. 2 is an exemplary illustration of a floating oil and gas drilling and production platform facility.

FIG. 2 is an exemplary illustration of a floating oil and gas drilling and production platform facility. The floating oil and gas drilling and production platform facility 210 may be positioned over a subsea well 214 below seafloor 208. A subsea conduit 218 extends from floating facility 210 to a subsea well installation 220. In one or more embodiments, the well may penetrate the various earth strata of a formation to form wellbore 222. Disposed within wellbore 222 is a casing string 224 which may be cemented within wellbore 222. Casing string 224 may typically be formed from a plurality of steel pipes. Additional casing string may be run in the well on service string 242 and the additional casing string may being installed within casing string 224.

In one or more embodiments, the wellbore may comprise one or more bores (not shown) that extend substantially both horizontally and vertically through a formation below seafloor 208. In one or more embodiments, bores may extend substantially horizontally through the formation. In one or more embodiments, bores may be used in production of the one or more fluids within a reservoir 250 within the formation.

In one or more embodiments, the seismic equipment on ship 100 may comprise or be coupled to one or more information handling systems, including without limitation a seismic data control, capture, and analysis unit for controlling operation of one or more sensors and one or sources, as well as receiving, aggregating, and processing data collected from the sensors. In one or more embodiments, the floating oil and gas drilling and production platform facility 210 may comprise one or more subsurface operations equipment. The one or more subsurface operations equipment may comprise or be coupled to equipment for one or more of identifying one or more locations, drilling one or more bores, preparing one or more bores for production of one or more fluids, and producing the one or more fluids. In one or more embodiments, the information handling systems comprise or be coupled to one or more displays for displaying data from one or more of the one or more sensors and one or more sources. In one or more embodiments, the information handling systems may enable displaying one or more suggestions based at least in part on the processing of data collected from one or more of the one or more sensors and the one or more sources. In one or more embodiments, these suggestions may comprise suggestions regarding the best use of the one or more subsurface operations equipment, and may further comprise suggestions related to one or more of identifying one or more locations, drilling one or more bores, preparing one or more bores for production of one or more fluids, and producing the one or more fluids.

FIGS. 1 and 2 merely illustrate an exemplary marine seismic survey system and exemplary marine oil and gas drilling and production facility. It should be understood by those skill in the art that this disclosure is equally applicable in onshore, offshore, subaquatic, and subterranean environments. Those in the art will understand that seismic data may be acquired using one or more systems, methods, and techniques, including without limitation seismic vibroseis and use of one or more explosives, including for example dynamite, as seismic sources. Similarly, those of skill in the art will understand oil and gas production may comprise one or more horizontal, vertical, deviated, or otherwise nonlinear wellbores in any type of subterranean formation, may be applicable to a variety of wells including without limitation injection wells and production wells, including hydrocarbon wells, and may be used to produce one or more fluids, including without limitation oil, gas, and water.

Figure 3:
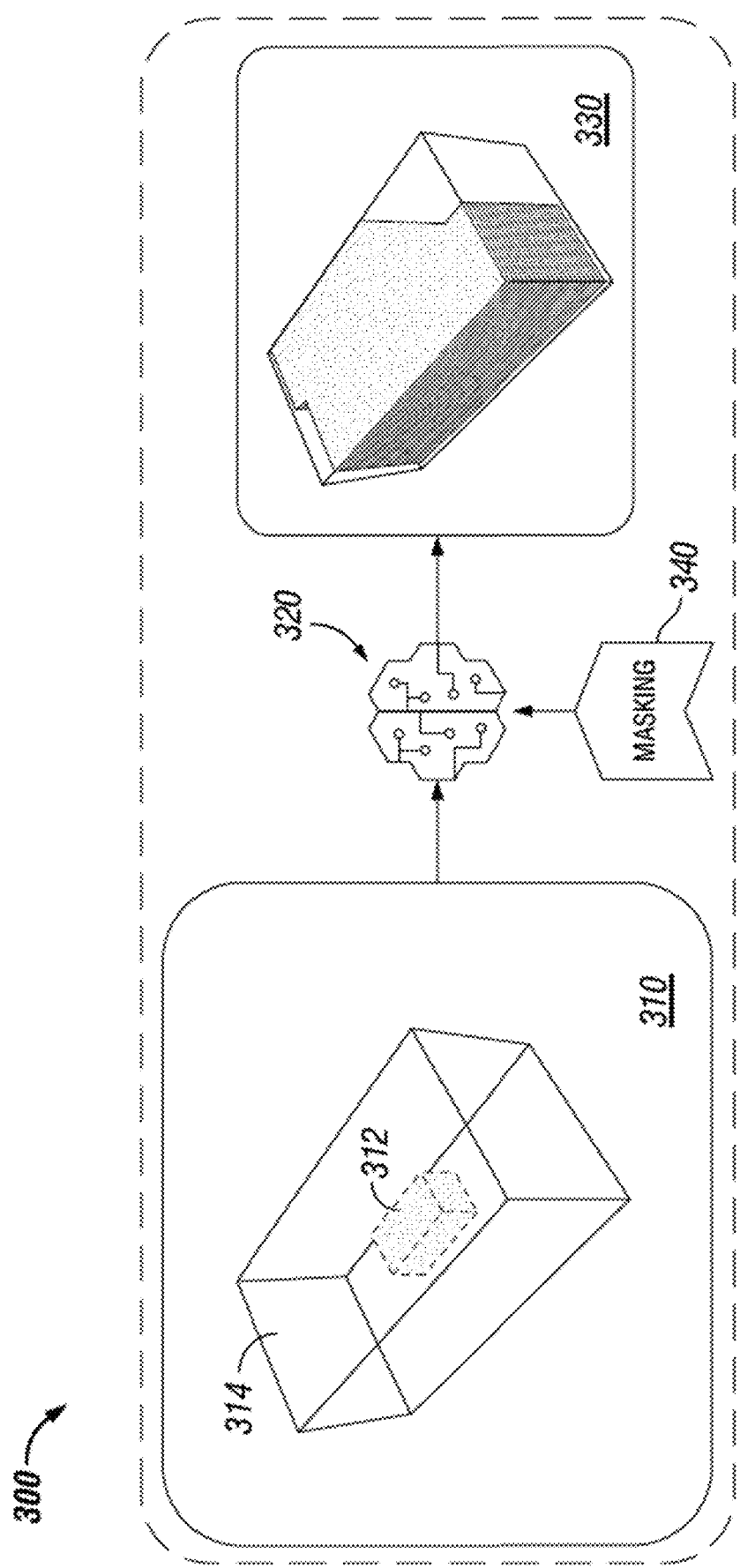
FIG. 3 is a high-level illustration of time-domain to depth-domain conversion using a machine learning model.

FIG. 3 is a high-level illustration 300 of a time-domain to depth-domain conversion using a machine learning model. A subsurface formation may be divided into a training area 312 and a study area 314. Time-domain seismic data 310 may be collected from the entire subsurface formation and the seismic data may be divided into seismic data corresponding to the training area 312 and seismic data corresponding to the study area 314. In one or more embodiments, the machine learning model 320 may be trained using inputs comprising the seismic data corresponding to the training area and a mask 340, and using well-calibrated depth data as a target (not shown). Once trained, the machine learning model may be used to accurately and efficiently convert the time-domain seismic data 310 corresponding to the study area 314 from the time domain 310 to the depth domain 330. The depth-domain data 330 may then be used to compute the depths of subsurface features of the study area of the subsurface formation (see FIG. 1), including for example, the depth of a reservoir, which may be used to compute the volume of the reservoir. In one or more embodiments, if well-calibrated depth data is unavailable, the machine learning model may be trained using well-tied time-depth curves as a target, and the machine learning model may be used to accurately and efficiently convert the seismic data corresponding to the study area from the time domain 310 to a plurality of time-depth curves in the depth domain 330. A time-depth curve is a function of time and depth that provides time values corresponding to seismic wave data at a plurality of depths. Time-depth curves may be used to model the velocity of seismic waves and convert time-domain data to depth-domain data.

Well-calibrated depth data represents seismic data converted to the depth domain, using for example velocity modeling. In one or more embodiments, well-calibrated depth data may involve depth-depth stretching or similar methods or techniques to correlate well depth to seismic-converted depth data. In one or more embodiments, uncertainties including without limitation procedural uncertainties, depth data provided by a velocity model may not accurately reflect actual measured depth in the subsurface formation. Accordingly, well-calibrated depth data may require additional calibration.

Figure 4:
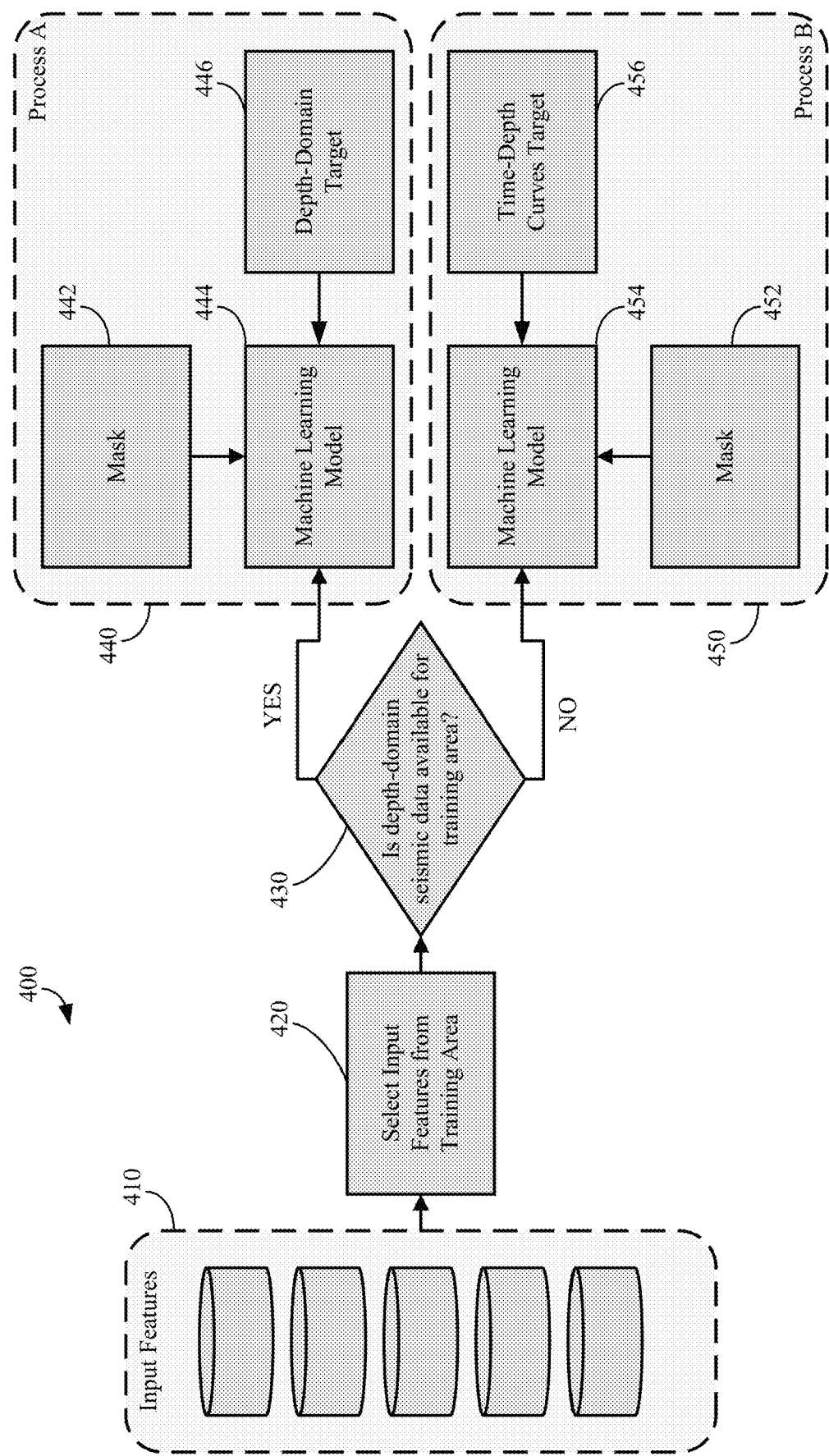
FIG. 4 is a flow diagram illustrating a method for training one or more machine learning models.

FIG. 4 is a flow diagram illustrating a method 400 for training one or more machine-learning models. In one or more embodiments, a plurality of input features 410 of a subsurface formation are collected. In one or more embodiments, the plurality of input features may comprise time-domain seismic data, such as data collected from one or more seismic sensors 170, 172 of FIG. 1. The subsurface formation may be divided into a training area and a study area. In step 420, a selection of the plurality of input features 410 that corresponds to the training area of the subsurface formation (the training area input features) may be selected. In step 430, the method may proceed one of two different ways. If well-calibrated depth-domain seismic data corresponding to the training area is available, then the method may proceed to step 440. However, if depth-domain seismic data corresponding to the training area is not available, then the method may proceed to step 450.

In step 440, the method executes a first process A. In process A, a first machine learning model 444 receives one or more inputs and one or more targets. In one or more embodiments, the one or more inputs may comprise the training area input features and may further comprise a first mask 442. In one or more embodiments, the one or more targets may comprise one or more depth-domain outputs 446, including for example, well-calibrated depth-domain data.

In step 450, the method executes a second process B. In process B, a second machine learning model 454 receives one or more inputs and one or more targets. In one or more embodiments, the one or more inputs may comprise the training area input features and may further comprise a second mask 452. In one or more embodiments, the one or more targets may comprise one or more well-tied time-depth curves 456.

Figure 5:
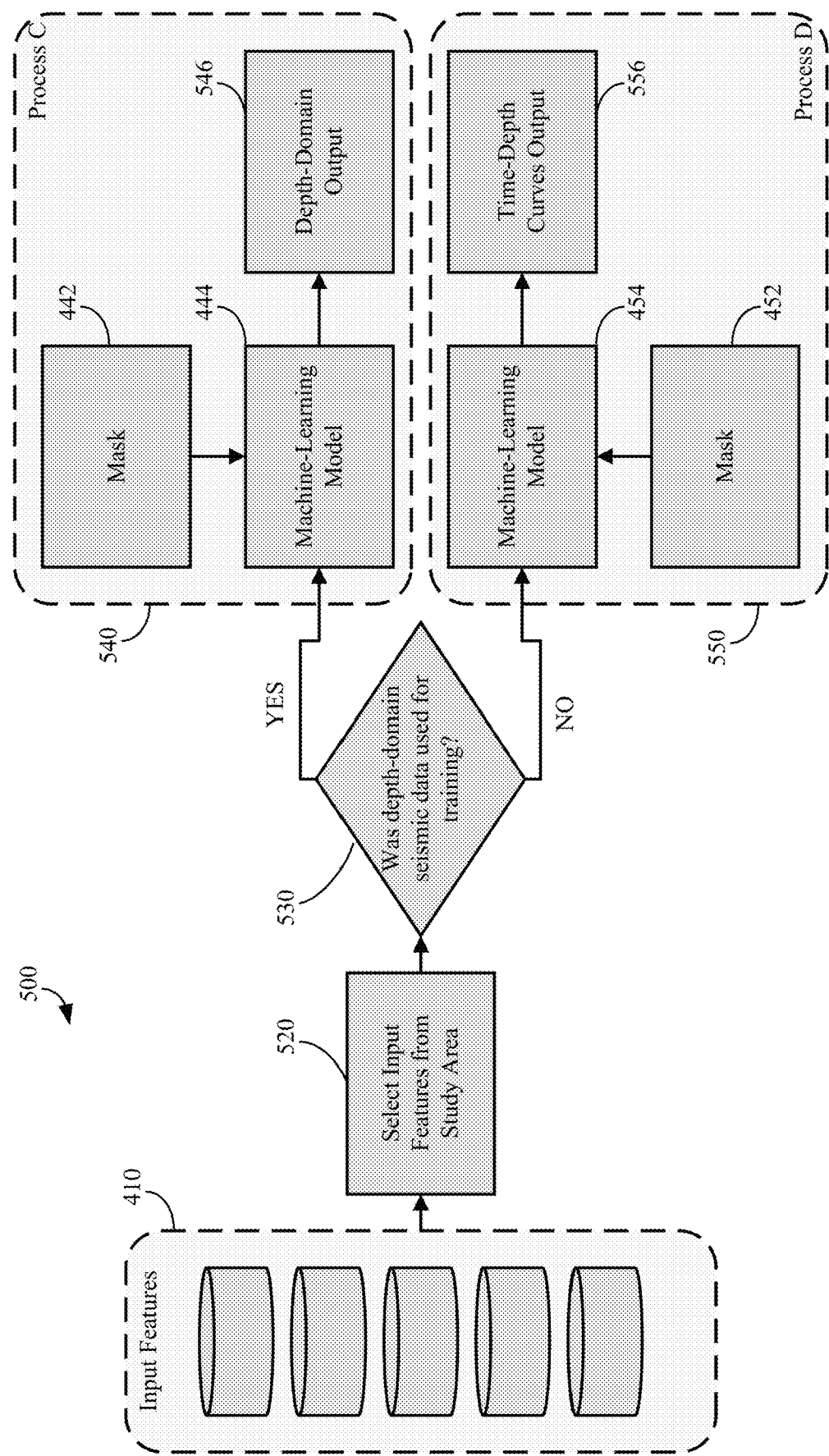
FIG. 5 is a flow diagram illustrating a method for applying one or more machine learning models.

FIG. 5 is a flow diagram illustrating a method 500 for applying the one or more machine-learning models. In step 520, a selection of the plurality of input features 410 that corresponds to the study area of the subsurface formation (the study area input features) may be selected. In step 530, the method may proceed one of two different ways. If, for example, well-calibrated depth-domain data was used to train machine learning model 444 in Process A of method 400, the method should proceed to Process C where machine learning model 444 may receive the study area input features. However, if, for example, well-calibrated depth-domain data was unavailable and machine learning model 454 was trained in Process B of method 400, machine learning model 454 may receive the plurality of input features. In one or more embodiments, one or more of machine learning model 444 and machine learning model 454 may receive one or more inputs, wherein the one or more inputs may comprise the study area input features.

In one or more embodiments, when using machine learning model 444 in Process C of method 500, the one or more inputs may further comprise the first mask 442. The machine learning model 444 may receive the one or more inputs and, based on the training of the model in Process A of method 400, machine learning model 444 may compute depth-domain data 546 corresponding to the study area of the subsurface formation.

In one or more embodiments, when using machine learning model 454 in Process D of method 500, the one or more inputs may further comprise the second mask 452. The machine learning model 454 may receive the one or more inputs and, based on the training of the model in Process B of method 400, machine learning model 454 may compute one or more time-depth curves 556 corresponding to the study area of the subsurface formation.

In one or more embodiments, the training area of the subsurface formation may comprise 20 percent or less (the training area) of the total subsurface formation. Time-domain seismic measurements for the remaining 80 percent or more (the study area) of the total subsurface formation may be available, but well-calibrated seismic depth data or well-tied time-depth curves may be unavailable for the study area of the subsurface formation. Accordingly, in one or more embodiments, machine learning model 444 may be used to compute depth-domain data 546 for the study area based on the time-domain seismic data measured from the study area. Alternatively, in one or more embodiments, machine learning model 454 may be used to compute time-depth curves 556 for the study area based on the time-domain seismic data measured from the study area.

In one or more embodiments, the machine learning model training may be subdivided into an initial training, validation, and testing. For example, seismic data corresponding to the training area of the subsurface formation may be subdivided into three non-overlapping sets: an initial training set, a validation set, and a testing set. The machine learning model 444, 454 may be trained using input features 410 from the initial training set. In one or more embodiments, the machine learning model 444, 454 may receive input features 410 from the validation set which may be used to tune or refine the machine learning model 444, 454. In one or more embodiments, the input features 410 from the validation area may also be used to evaluate the unbiased performance of the machine learning model 444, 454. In one or more embodiments, the machine learning model 444, 454 may receive input features 410 from the testing area of the subsurface formation which may be used to provide a final unbiased evaluation of the performance of the machine learning model 444, 454 before the machine learning model 444, 454 may be used to compute the depth-domain data or time-depth curves corresponding to the study area.

In one or more embodiments, mask inputs to a machine learning model may comprise fault polygons. A mask comprising fault polygons may enable one or more machine learning models using multiple layers to improve training and predictive accuracy. In one or more embodiments, the fault polygon mask may enable multiple neuron levels within the machine learning model to better predict a plurality of different geological features of the subsurface formation and thereby enable improved time-domain to depth-domain conversions. Additionally, the mask function may prevent data leakage in these processes. In particular, fault polygons may reduce or eliminate unwanted data leakage in the domain conversion. Fault polygons as mask functions in the machine learning model may also enhance the accuracy of the domain conversion and may honor the complex subsurface geology.

In one or more embodiments, one or more of the machine learning models 444, 454 may comprise one or more types of neural networks, including without limitation single layer neural networks and shallow neural networks, as well as deep neural networks. Deep neural networks may comprise multiple hidden layers, including without limitation multi-layer perceptrons, feed-forward principal neural networks, convolutional neural networks, recursive neural networks, recurrent neural networks, and long short-term memory neural networks.

In one or more embodiments, input features to a machine learning model may comprise one or more of post-stack seismic attributes data. Post-stack attributes may comprise one or more of the amplitude, phase, and frequency of seismic data, as well as derivatives thereof. One or more post-stack seismic attributes may incorporate and emphasize certain subsurface information that improve performance of the domain conversion of the machine learning models.

In one or more embodiments, the target one or more depth-domain seismic outputs 446 may comprise data produced using one or more conventional processes, including without limitation velocity modeling. Existing software products may be inefficient, require multiple steps, and may require user expertise, but may be necessary to produce the target data comprising one or more of well-calibrated depth-domain data and well-tied time-depth curves. Additionally, existing products may provide robust functionalities for computing subsurface depth data, may provide a geologic framework, and may support computation of subsurface volumes.

Any one or more embodiments of the present disclosure may be implemented through a computer-executable program of instructions, such as program modules, generally referred to as software applications or application programs executed by a computer. A software application may include, for example, routines, programs, objects, components, data structures, any other executable instructions, or any combination thereof, that perform particular tasks or implement particular abstract data types. The software application forms an interface to allow a computer to react according to a source of input. For example, an interface application may be used to implement any one or more embodiments of the present disclosure. The software application may also cooperate with other applications or code segments to initiate a variety of tasks based, at least in part, on data received, a source of data, or any combination thereof. Other applications or code segments may provide optimization components including, but not limited to, neural networks, earth modeling, history-matching, optimization, visualization, data management, and economics. The software application may be stored, carried, or both on any variety of memory such as CD-ROM, magnetic disk, optical disk, bubble memory, and semiconductor memory (for example, various types of RAM or ROM). Furthermore, the software application and one or more inputs or outputs may be transmitted over a variety of carrier media including, but not limited to wireless, wired, optical fiber, metallic wire, telemetry, any one or more networks (such as the Internet), or any combination thereof.

Moreover, those skilled in the art will appreciate that one or more of the embodiments may comprise a variety of computer-system configurations, including hand-held devices, multiprocessor systems, microprocessor-based or programmable consumer electronics, minicomputers, mainframe computers, and any combination thereof. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software, or any combination thereof, in a computer system, information handling system, or other processing system.

Figure 6:
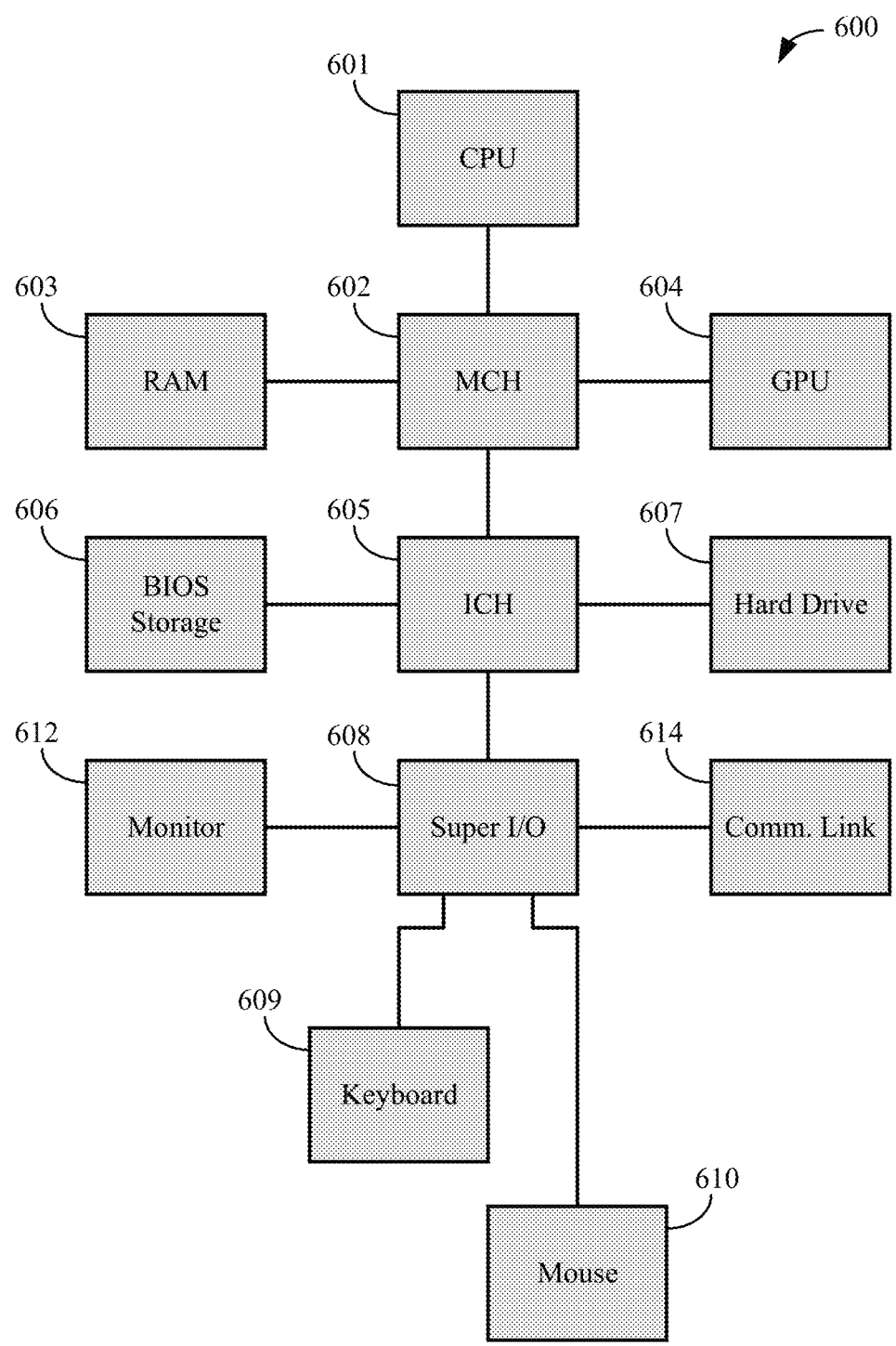
FIG. 6 is a diagram of an example information handling system, according to one or more aspects of the present disclosure.

Referring now to FIG. 6, a block diagram illustrates one embodiment of a system for implementing one or more embodiments of the present invention. The system includes a computing device 600, sometimes referred to as a computing system or information handling system, which comprises memory such as random access memory (RAM) 603, application programs (not shown here), a Super I/O chip 608 which may be coupled to a mouse 610 and a keyboard 609, a monitor 612, and a central processing unit (CPU) 601. The CPU 601, the GPU 604, and the RAM 603 may be coupled a memory controller hub (MCH) 602. The system may also include one or more storage devices, such as a read-only memory (ROM) storage element containing instructions for a basic input and output system (BIOS) 606 and a hard drive 607. The ROM 606, the hard drive 607, and the Super I/O chip 608 may be coupled to an input/output controller hub (ICH) 605. The MCH 602 and ICH 605 may be coupled to one another. The computing device is only one example of a suitable computing environment and is not intended to suggest any limitation as to the scope of use or functionality of the disclosure.

A memory or storage device primarily stores one or more software applications or programs, which may also be described as program modules containing computer-executable instructions, which may be executed by the computing unit for implementing one or more embodiments of the present disclosure. The memory, therefore, may include one or more applications including, for example, a seismic sensor measurement application and one or more machine learning models, which may enable one or more of the processes or sub-processes illustrated in FIGS. 4 and 5. These applications may integrate functionality from additional or third-party application programs or from system files stored in memory or on a storage device. An application may perform one or more of the steps in FIGS. 4 and 5. System files, such as an ASCII text file may be used to store the instructions, data input, or both for the machine learning models as may be required in, for example, one or more steps of FIGS. 4 and 5 discussed herein. In certain embodiments, any one or more other applications may be used in combination. In certain embodiments, any one or more other applications may be used in combination may be used as stand-alone applications.

Although the computing device 600 is shown as having one or more generalized memories, the computing device 600 typically includes a variety of non-transitory computer readable media. By way of example, and not limitation, non-transitory computer readable media may comprise computer storage media and communication media. The memory may include computer storage media, such as a ROM and RAM in the form of volatile memory, nonvolatile memory, or both. A BIOS containing the basic routines that help to transfer information between elements within the computing unit, such as during start-up, is typically stored in the ROM. RAM typically contains data, program modules, other executable instructions, or any combination thereof that are immediately accessible to, presently being operated on, or both by the processing unit. By way of example, and not limitation, the computing device 600 may include an operating system, application programs, other program modules, and program data.

The components shown in the memory may also be included in other removable/non-removable, volatile/non-volatile non-transitory computer storage media or the components may be implemented in the computing device 600 through an application program interface ("API") or cloud computing, which may reside on a separate computing device coupled through a computer system or network (not shown). For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that may be used in the exemplary operating environment may include, but are not limited to, magnetic tape cassettes, flash memory cards, digital versatile disks, digital video tape, solid state RAM, solid state ROM, or the like. The drives and their associated computer storage media discussed above provide storage of computer readable instructions, data structures, program modules, and other data for the computing unit.

The computing device 600 may receive commands or information from a user through one or more input devices such as the keyboard 609 and the mouse 610. Additional input devices may comprise a microphone, joystick, touchscreen, scanner, voice or gesture recognition, one or more sensors including one or more seismic sensors, and the like (not shown). These and other input devices may be coupled to the processing unit through the Super I/O chip 608 that is coupled to the ICH 605, but may be coupled by other interface and bus structures, such as a parallel port or a universal serial bus (USB) (not shown).

A monitor or other type of display device (not shown) may be coupled to the MCH 602 via an interface, such as the GPU 604 or via Super I/O chip 608. A graphical user interface ("GUI") may also be used with the video interface 604 to receive instructions from a user and transmit instructions to the central processing unit 601. A GUI may be used to display the outputs of the processes described in FIGS. 4 and 5, and may be used to prompt or display modification of subsurface operations or production activities. The computing device 600 may comprise peripheral output devices such as speakers, printer, external memory, any other device, or any combination thereof, which may be coupled through any output peripheral interface.

Any one or more input/output devices may receive and transmit data in analog or digital form over one or more communication links 614 such as a serial link, a wireless link (for example, infrared, radio frequency, or others), a parallel link, or another type of link. The one or more communication links 614 may comprise any type of communication channel, connector, data communication network, or other link. For example, the one or more communication links 614 may comprise a wireless or a wired network, a Local Area Network (LAN), a Wide Area Network (WAN), a private network, a public network (such as the Internet), a wireless fidelity or WiFi network, a network that includes a satellite link, or another type of data communication network.

Although many other internal components of the computing device 600 are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof. In particular, with regards to the methods disclosed, one or more steps may not be required in all embodiments of the methods and the steps disclosed in the methods may be performed in a different order than was described.

What is claimed is:

1. A method for optimizing seismic to depth conversion to enhance subsurface operations, the method comprising:
measuring time-domain seismic data in a subsurface formation;
dividing the subsurface formation into a training area and a study area;
dividing the time-domain seismic data into training seismic data and study seismic data, wherein the training seismic data corresponds to the training area, and wherein the study seismic data corresponds to the study area;
calculating target depth data corresponding to the training area;

training a machine learning model using training inputs and training targets, wherein the training inputs comprise the training seismic data, and wherein the training targets comprise the target depth data;

converting, by the machine learning model, the time-domain seismic data of the study seismic data to depth-domain seismic data of the study seismic data;

generating output depth data corresponding to the study area based at least in part on the depth-domain seismic data of the study seismic data; and modifying one or more subsurface operations corresponding to the study area based at least in part on the output depth data.

2. The method of claim 1, wherein the machine learning model comprises a deep neural network.

3. The method of claim 1, further comprising:
dividing the training area into a validating area and a testing area;
dividing the training seismic data into validating seismic data and testing seismic data, wherein the validating seismic data corresponds to the validating area, and wherein the testing seismic data corresponds to the test area;
dividing the target depth data into validating depth data and testing depth data, wherein the validating depth data corresponds to the validating area, and wherein the testing depth data corresponds to the testing area; and
validating the machine learning model using validating inputs and validating targets, wherein the validating inputs comprise the validating seismic data, and wherein the validating targets comprise the validating depth data; and
testing the machine learning model using testing inputs and testing targets, wherein the testing inputs comprise the testing seismic data, and wherein the testing targets comprise the testing depth data.

4. The method of claim 3, wherein the validating seismic data and the testing seismic data are mutually exclusive, and wherein the validating depth data and the testing depth data are mutually exclusive.

5. The method of claim 1, wherein the training inputs further comprise one or more post-stack attributes.

6. The method of claim 1, wherein the training inputs further comprise one or more mask functions.

7. The method of claim 6, wherein the one or more mask functions comprises use of fault polygons.

8. The method of claim 1, wherein the training seismic data comprises 20 percent or less of the seismic data and the study seismic data comprises the remainder of the seismic data.

9. The method of claim 1, wherein the target depth data comprises one or more time-depth target curves, and the output depth data comprises one or more time-depth output curves.

10. A non-transitory computer readable medium for storing one or more instructions that, when executed, causes a processor to:
divide time-domain seismic data into training seismic data and study seismic data, wherein the training seismic data corresponds to a training area of a subsurface formation, and wherein the study seismic data corresponds to a study area of the subsurface formation;
train a machine learning model using training inputs and training targets, wherein the training inputs comprise the training seismic data, wherein the training targets comprise target depth data, and wherein the target depth data corresponds to the training area of the subsurface formation;
convert, by the machine learning model, the time-domain seismic data of the study area to depth-domain seismic data;
generate output depth data based at least in part on the depth-domain seismic data of the study seismic data, wherein the output depth data corresponds to the study area of the subsurface formation, and wherein the study seismic data corresponds to the study area of the subsurface formation; and
suggest one or more subsurface operations corresponding to the study area of the subsurface formation based at least in part on the output depth data.

11. The non-transitory computer readable medium of claim 10, wherein the machine learning model comprises a deep neural network.

12. The non-transitory computer readable medium of claim 10, wherein the one or more instructions that, when executed, further causes a processor to:
divide the training seismic data into validating seismic data and testing seismic data, wherein the validating seismic data corresponds to a validating area of the subsurface formation, wherein the testing seismic data corresponds to a test area of the subsurface formation, and wherein the validating seismic data and the testing seismic data are mutually exclusive;
divide the target depth data into validating target depth data and testing target depth data, wherein the validating target depth data corresponds to the validating area, wherein the testing target depth data corresponds to the testing area, and wherein the validating target depth data and the testing target depth data are mutually exclusive;
validate the machine learning model using validating inputs and validating targets, wherein the validating inputs comprise the validating seismic data, and wherein the validating targets comprise the validating target depth data; and
test the machine learning model using testing inputs and testing targets, wherein the testing inputs comprise the testing seismic data, and wherein the testing targets comprise the testing target depth data.

13. The non-transitory computer readable medium of claim 10, wherein the training inputs further comprise one or more post-stack attributes.

14. The non-transitory computer readable medium of claim 10, wherein the training inputs further comprise one or more mask functions, and wherein the one or more mask functions comprises use of fault polygons.

15. The non-transitory computer readable medium of claim 10, wherein the training seismic data comprises 20 percent or less of the seismic data and the study seismic data comprises the remainder of the seismic data.

16. A system for optimizing seismic to depth conversion to enhance subsurface operations, the system comprising:
one or more seismic sensors for measuring time domain seismic data from a subsurface formation;
a machine learning model, wherein the machine learning model is coupled to the one or more seismic sensors, wherein the machine learning model is trained using training inputs and training targets, wherein the training inputs comprise training seismic data derived from time domain seismic data, wherein the training seismic data corresponds to a training area of the subsurface formation, wherein the training targets comprise target depth data, wherein the target depth data corresponds to the training area of the subsurface formation, wherein the machine learning model converts time-domain seismic data of a study area to depth-domain seismic data, wherein the machine learning model computes output depth data based at least in part on the depth-domain seismic data of the study seismic data, wherein the study seismic data corresponds to a study area of the subsurface formation; and one or more subsurface operations equipment, wherein the one or more subsurface operations equipment receives the output depth data, and wherein the one or more subsurface operations equipment modify one or more subsurface operations based at least in part on the output depth data.

17. The system of claim 16, wherein the machine learning model comprises a deep neural network.

18. The system of claim 16, wherein the training inputs further comprise one or more mask functions, and wherein the one or more mask functions comprises use of fault polygons.

19. The system of claim 16, wherein the target depth data comprises one or more of one or more depths, one or more volumes, and one or more time-depth target curves, and wherein the output depth data comprises one or more of one or more depths, one or more volumes, and one or more time-depth output curves.

20. The system of claim 16, wherein the one or more subsurface operations equipment modify the one or more subsurface operations by one or more of identifying one or more locations, drilling one or more bores, preparing one or more bores for production of one or more fluids, and producing the one or more fluids.

* * * * *